United States Patent
Hertsgaard et al.

(10) Patent No.: US 11,345,403 B2
(45) Date of Patent: May 31, 2022

(54) ENGINE MOUNTING SYSTEM FOR A WORK VEHICLE

(71) Applicant: CNH Industrial America LLC, New Holland, PA (US)

(72) Inventors: Timothy Ralph Hertsgaard, Fargo, ND (US); John Thomas Rasset, Barnesville, MN (US)

(73) Assignee: CNH Industrial America LLC, New Holland, PA (US)

( * ) Notice: Subject to any disclaimer, the term of this patent is extended or adjusted under 35 U.S.C. 154(b) by 434 days.

(21) Appl. No.: 16/587,347

(22) Filed: Sep. 30, 2019

(65) Prior Publication Data

US 2021/0094617 A1    Apr. 1, 2021

(51) Int. Cl.
| | |
|---|---|
| *B60K 5/12* | (2006.01) |
| *B62D 21/11* | (2006.01) |
| *B62D 27/02* | (2006.01) |
| *B60K 5/00* | (2006.01) |

(52) U.S. Cl.
CPC ............. *B62D 21/11* (2013.01); *B60K 5/00* (2013.01); *B60K 5/12* (2013.01); *B62D 27/02* (2013.01)

(58) Field of Classification Search
CPC .. B62D 21/11; B62D 21/2702; B62D 21/186; B62D 55/065; B60K 5/00; B60K 5/12
See application file for complete search history.

(56) References Cited

U.S. PATENT DOCUMENTS

| | | | | |
|---|---|---|---|---|
| 4,392,545 | A * | 7/1983 | Harasaki | B60K 5/04 180/294 |
| 5,218,814 | A * | 6/1993 | Teal | A01D 34/64 180/291 |
| 5,791,627 | A * | 8/1998 | Fisch | B60K 5/00 248/221.12 |
| 6,223,850 | B1 * | 5/2001 | Rajca | B60K 5/12 180/312 |
| 6,886,818 | B2 | 5/2005 | Kim | |
| 6,964,221 | B2 | 11/2005 | Mickelson et al. | |

(Continued)

FOREIGN PATENT DOCUMENTS

| | | | | |
|---|---|---|---|---|
| DE | 102011086165 A1 * | 5/2013 | | B60K 5/00 |
| EP | 1418078 A2 * | 5/2004 | | B62D 21/11 |

(Continued)

*Primary Examiner* — Karen Beck
(74) *Attorney, Agent, or Firm* — Rickard K. DeMille; Rebecca L. Henkel (57) ABSTRACT

An engine mounting system for a work vehicle includes an engine mount configured to support an engine on a frame of the work vehicle. The engine mount has an engine mounting portion and a frame connection portion, an extent of the frame connection portion along a lateral axis of the engine mount is greater than an extent of the engine mounting portion along the lateral axis, the engine mounting portion has an opening configured to receive a fastener configured to couple the engine to the engine mount, the frame connection portion has a substantially flat contact surface configured to engage a corresponding substantially flat contact surface of a frame member of the frame, and the engine mounting portion does not contact the frame member while the substantially flat contact surface of the frame connection portion is engaged with the corresponding substantially flat contact surface of the frame member.

20 Claims, 4 Drawing Sheets

(56) References Cited

U.S. PATENT DOCUMENTS

| | | |
|---|---|---|
| 7,490,691 B2 | 2/2009 | Reese et al. |
| 7,513,329 B2 | 4/2009 | Nakashima et al. |
| 7,987,942 B2 | 8/2011 | Lee |
| 8,226,097 B2 * | 7/2012 | Kudla .................... B62D 21/11 |
| | | 280/93.515 |
| D686,252 S | 7/2013 | Urase et al. |
| 9,096,991 B2 | 8/2015 | Zheng et al. |
| 9,616,737 B2 | 4/2017 | Bourlon et al. |
| 9,630,484 B1 * | 4/2017 | Valdez .................... B60K 5/12 |
| 10,059,377 B2 | 8/2018 | Shimizu |
| 2011/0062677 A1 * | 3/2011 | Kudla .................... B62D 21/11 |
| | | 280/124.109 |
| 2019/0054875 A1 * | 2/2019 | Ehn ...................... B62D 21/152 |
| 2019/0126460 A1 * | 5/2019 | Mittelstadt ............... B25H 1/00 |

FOREIGN PATENT DOCUMENTS

| | | |
|---|---|---|
| JP | H10258763 | 9/1998 |
| WO | 2011151571 | 12/2011 |

* cited by examiner

ENGINE MOUNTING SYSTEM FOR A WORK VEHICLE

BACKGROUND

The present disclosure relates generally to an engine mounting system for a work vehicle.

Work vehicles (e.g., tractors, harvesters, sprayers, etc.) typically include an engine configured to propel the work vehicle (e.g., through an agricultural field, between fields, etc.). The engine is generally mounted to a frame of the work vehicle via multiple engine mounts. Certain engine mounts are welded to the frame and include an opening configured to receive a fastener that couples the engine to the engine mount. The engine mounts support the engine on the frame during operation of the work vehicle.

BRIEF DESCRIPTION

In certain embodiments, an engine mounting system for a work vehicle includes an engine mount configured to support an engine on a frame of the work vehicle. The engine mount has an engine mounting portion and a frame connection portion, and the engine mounting portion and the frame connection portion are positioned on opposite longitudinal sides of the engine mount. In addition, an extent of the frame connection portion along a lateral axis of the engine mount is greater than an extent of the engine mounting portion along the lateral axis of the engine mount. The engine mounting portion has an opening extending between a first surface and a second surface of the engine mounting portion, and the opening is configured to receive a fastener configured to couple the engine to the engine mount. Furthermore, the frame connection portion has a substantially flat contact surface configured to engage a corresponding substantially flat contact surface of a frame member of the frame. The first surface of the engine mounting portion is coplanar with the substantially flat contact surface of the frame connection portion, and the engine mounting portion does not contact the frame member while the substantially flat contact surface of the frame connection portion is engaged with the corresponding substantially flat contact surface of the frame member.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
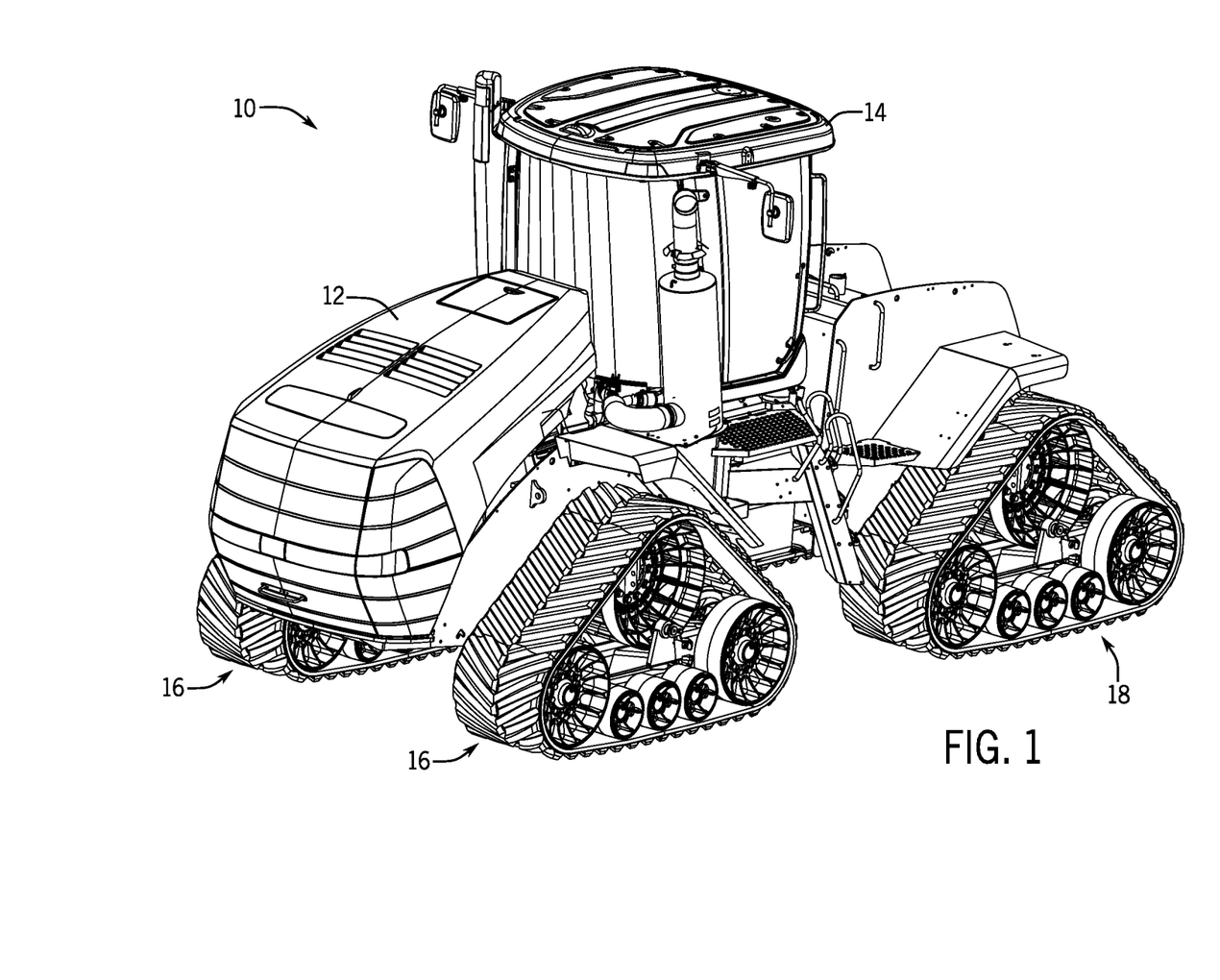
FIG. 1 is a perspective view of an embodiment of a work vehicle having an engine coupled to a frame of the work vehicle via multiple engine mounts.

FIG. 1 is a perspective view of an embodiment of a work vehicle 10 having an engine coupled to a frame of the work vehicle via multiple engine mounts. In the illustrated embodiment, the work vehicle 10 is a tractor. However, the engine mounts disclosed herein may be employed within other work vehicles, such as off-road vehicles (e.g., skids steers, construction equipment, etc.), agricultural vehicles (e.g., harvesters, sprayers, etc.), or any other suitable work vehicle types. In the illustrated embodiment, the work vehicle 10 has a body 12 configured to house an engine (e.g., diesel engine), a transmission, a cooling system, and a hydraulic system. Furthermore, the work vehicle 10 has a cab 14 where an operator may sit or stand to operate the work vehicle 10. The work vehicle 10 also has two front track assemblies 16 (e.g., each including wheels and a track) and two rear track assemblies 18 (e.g., each including wheels and a track) that move the work vehicle 10 through a field. The front track assemblies 16 and/or the rear track assemblies 18 may be driven to rotate by the engine and/or the hydraulic system (e.g., hydraulic motor(s) of the hydraulic system). While the illustrated work vehicle 10 includes track assemblies, in other embodiments, the work vehicle may include wheel assemblies or a combination of wheel and track assemblies.

In certain embodiments, the engine of the work vehicle 10 is coupled to a frame of the work vehicle via multiple engine mounts. The engine mounts support the engine on the frame and align the engine with other components of the work vehicle (e.g., the transmission, the cooling system, the hydraulic system, etc.). In certain embodiments, at least one engine mount has an engine mounting portion and a frame connection portion. The engine mounting portion and the frame connection portion are positioned on opposite longitudinal sides of the engine mount. In addition, the engine mounting portion has an opening extending between a first surface and a second surface of the engine mounting portion, in which the opening is configured to receive a fastener that couples the engine to the engine mount. The frame connection portion has a substantially flat contact surface configured to engage a corresponding substantially flat contact surface of a frame member of the frame, and the first surface of the engine mounting portion is coplanar with the substantially flat contact surface of the frame connection portion. The engine mount may be coupled to the frame member by a weld that extends along the frame connection portion.

Furthermore, an extent of the frame connection portion along a lateral axis of the engine mount is greater than an extent of the engine mounting portion along the lateral axis of the engine mount. Because the lateral extent of the frame connection portion is greater than the lateral extent of the engine mounting portion, a substantial portion of the load/force applied by the engine to the weld via the engine mount may be directed through a laterally central portion of the weld. As a result, the longevity of the engine mount may be increased because stress concentrations are less likely to be present at the laterally central portion of the weld (e.g., as compared to the lateral end portions of the weld).

Figure 2:
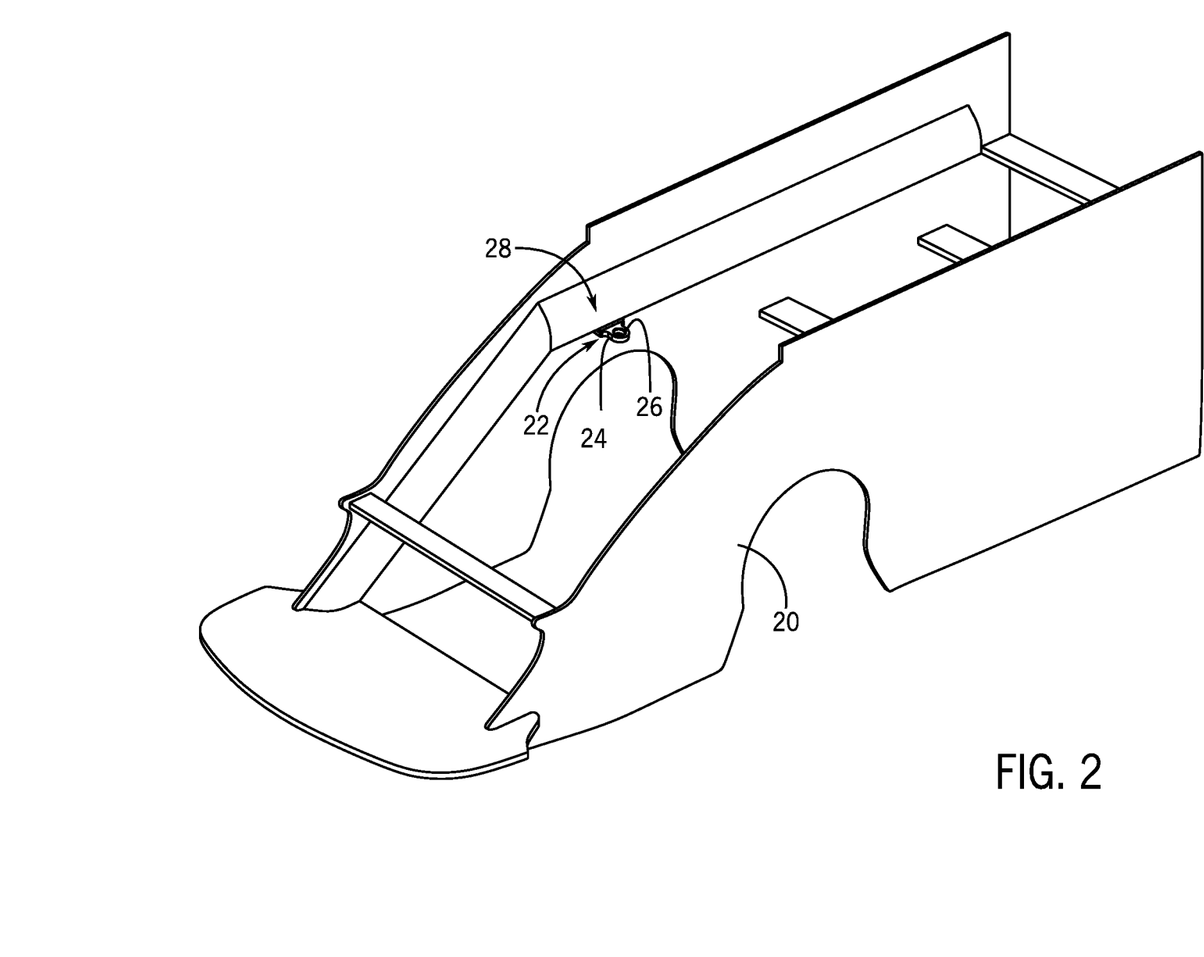
FIG. 2 is a perspective view of an embodiment of a frame that may be employed within the work vehicle of FIG. 1.

FIG. 2 is a perspective view of an embodiment of a frame 20 that may be employed within the work vehicle of FIG. 1. The frame 20 is configured to support the engine, the transmission, and various other components of the work vehicle. An engine mounting system 22 is configured to couple the engine to the frame 20, thereby enabling the frame 20 to support the engine. In the illustrated embodiment, the engine mounting system 22 includes engine mount(s) 24 configured to couple the engine to the frame 20. The engine mount(s) 24 are configured to transfer the load/force of the engine (e.g., due to gravity, engine torque, work vehicle vibrations, etc.) to the frame 20. The illustrated engine mount 24 has an opening 26 configured to receive a fastener (e.g., bolt, screw, pin, etc.) that couples the engine to the engine mount 24. In certain embodiments, a vibration dampening element (e.g., bushing, grommet, etc.) may also extend through the opening 26 (e.g., around the fastener) to reduce the transmission of vibrations from the engine to the frame 20. In addition, the engine mount 24 is coupled to the frame 20 by a welded connection 28 (e.g., including one or more welds). While a single engine mount 24 of the engine mounting system 22 is shown in FIG. 2, the engine mounting system may include any suitable number of engine mounts (e.g., 1, 2, 3, 4, 5, 6, 7, 8, 9, 10, or more), each having the same configuration as the illustrated engine mount or a different suitable configuration.

Figure 3:
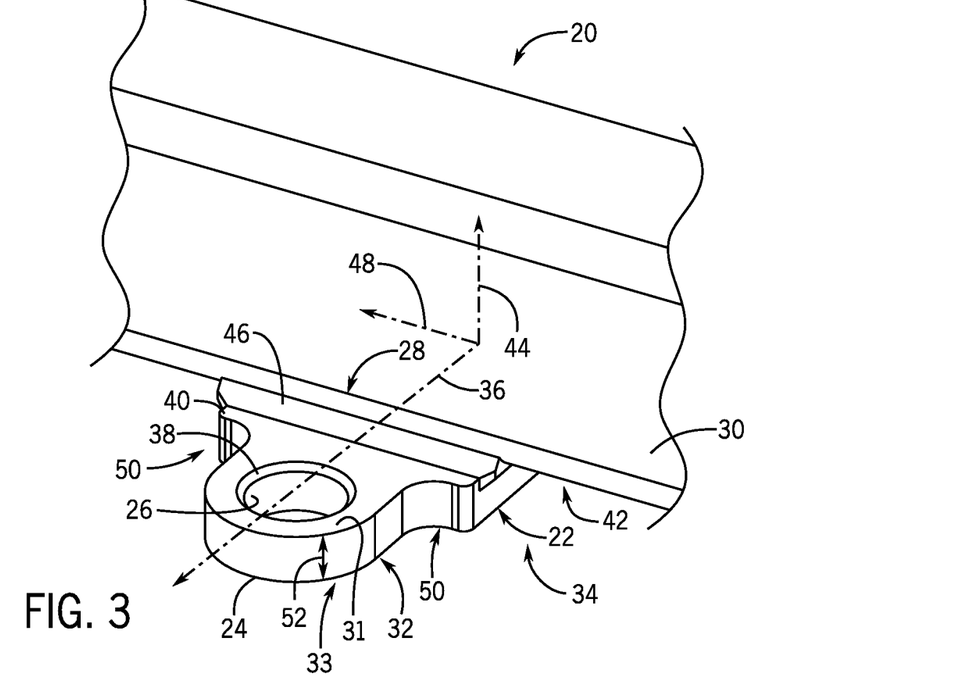
FIG. 3 is a top perspective view of an embodiment of a frame member that may be employed within the frame of FIG. 2, and an embodiment of an engine mount coupled to the frame member.

FIG. 3 is a top perspective view of an embodiment of a frame member 30 that may be employed within the frame 20 of FIG. 2, and an embodiment of an engine mount 24 coupled to the frame member 30. As previously discussed, the engine mount 24 is an element of the engine mounting system 22. The engine mount 24 is configured to couple the engine of the work vehicle to the frame 20/support the engine on the frame 20. In the illustrated embodiment, the engine mount 24 has an engine mounting portion 32 and a frame connection portion 34. As illustrated, the engine mounting portion 32 and the frame connection portion 34 are positioned on opposite longitudinal sides of the engine mount 24 (e.g., opposite sides of the engine mount 24 along a longitudinal axis 36 of the engine mount 24). Furthermore, the engine mounting portion 32 has the opening 26 extending between a first surface 31 and a second surface 33 of the engine mounting portion 32. The opening 26 is configured to receive the fastener that couples the engine to the engine mount 24. In the illustrated embodiment, the opening 26 has a chamfered end (e.g., at the first surface 31) to facilitate engagement of the fastener/vibration dampening element with the engine mount 24. However, in other embodiments, the opening may have a filleted end, a straight end, or an end of another suitable shape (e.g., at the first surface and/or at the second surface). For example, in certain embodiments, the opening may have a chamfered end at the second surface.

In the illustrated embodiment, the frame connection portion 34 has a substantially flat contact surface 40 configured to engage a corresponding substantially flat contact surface 42 of the frame member 30. As used herein, "substantially flat" refers to a maximum variation within the respective contact surface (e.g., along a vertical axis 44 of the engine mount 24) of less than 1 mm, less than 0.5 mm, less than 0.4 mm, less than 0.3 mm, less than 0.2 mm, or less than 0.1 mm. In the illustrated embodiment, the first surface 31 of the engine mounting portion 32 is coplanar with the substantially flat contact surface 40 of the frame connection portion 34. As used herein, "coplanar" refers to an angular variation between the plane of the first surface 31 and the plane of the substantially flat contact surface 40 of less than 1 degree, less than 0.75 degrees, less than 0.5 degrees, or less than 0.25 degrees, and an offset between the plane of the first surface 31 and the plane of the substantially flat contact surface 40 (e.g., along the vertical axis 44) of less than 1 mm, less than 0.5 mm, less than 0.4 mm, less than 0.3 mm, less than 0.2 mm, or less than 0.1 mm. However, in other embodiments, the plane of the first surface may be angled and/or offset relative to the plane of the substantially flat contact surface of the frame connection portion. Furthermore, in the illustrated embodiment, a longitudinal axis of the opening 26 is substantially perpendicular to the first surface 31/substantially flat contact surface 40. However, in other embodiments, the longitudinal axis of the opening may be angled relative to an axis (e.g., the vertical axis) extending perpendicularly to the first surface/substantially flat contact surface of the frame connection portion.

In the illustrated embodiment, the engine mounting system 22 includes the welded connection 28 between the frame connection portion 34 of the engine mount 24 and the frame member 30, which in certain embodiments is also an element of the engine mounting system 22. As illustrated, a weld 46 of the welded connection 28 extends laterally (e.g., along a lateral axis 48 of the engine mount 24) across the substantially flat contact surface 40 of the frame connection portion 34 of the engine mount 24. As discussed in detail below, the welded connection 28 also includes a weld extending along each lateral side of the frame connection portion. The welds of the welded connection 28 are configured to couple the engine mount 24 to the frame member 30. In addition, contact between the substantially flat contact surface 40 of the engine mount 24 and the corresponding substantially flat contact surface 42 of the frame member 30 substantially blocks rotation of the engine mount 24 relative to the frame member 30 about the longitudinal axis 36 and about the lateral axis 48.

In the illustrated embodiment, an extent of the frame connection portion 34 along the lateral axis 48 of the engine mount 24 is greater than an extent of the engine mounting portion 32 along the lateral axis 48 of the engine mount 24. As used herein, the engine mounting portion 32 is the portion of the engine mount 24 that has the opening 26, and the frame connection portion 34 is the portion of the engine mount 24 that has the substantially flat contact surface 40. Accordingly, the opening 26 does not extend into the frame connection portion 34 (i.e., the frame connection portion 34 does not include any portion of the opening 26). As previously discussed, the engine mounting portion 32 and the frame connection portion 34 are positioned on opposite longitudinal sides of the engine mount 24 (e.g., one or more additional portions, such as a transition portion, may be longitudinally disposed between the engine mounting portion 32 and the frame connection portion 34). Because the lateral extent of the frame connection portion 34 is greater than the lateral extent of the engine mounting portion 32, a substantial portion of the load/force applied by the engine to the weld 46 via the engine mount 24 may be directed through a laterally central portion of the weld 46 (e.g., a center portion of the weld 46 along the lateral axis 48). As a result, the longevity of the engine mount 24 may be increased because stress concentrations are less likely to be present at the laterally central portion of the weld (e.g., as compared to the lateral end portions of the weld).

In the illustrated embodiment, the frame connection portion 34 extends laterally beyond the extent of the engine mounting portion 32 along the lateral axis 48 on both lateral sides of the engine mounting portion 32. As a result, a greater portion of the load/force applied by the engine to the weld 46 via the engine mount 24 may be directed through the laterally central portion of the weld 46, as compared to an engine mount that includes a frame connection portion that extends laterally beyond the extent of the engine mounting portion along the lateral axis on a single lateral side of the engine mounting portion. However, in other embodiments, the engine mount may include a frame connection portion that extends laterally beyond the extent of the engine mounting portion along the lateral axis on a single lateral side of the engine mounting portion.

In the illustrated embodiment, the engine mount has a pair of curved transitions 50 between the engine mounting portion 32 and the frame connection portion 34. The curved transitions 50 are configured to substantially reduce stress concentrations at the interface between the engine mounting portion and the frame connection portion and/or to direct an increased portion of the load/force applied by the engine to the laterally extending weld through the laterally central portion of the weld. While the engine mount has two curved transitions in the illustrated embodiment, in other embodiments, at least one transition may have another suitable shape (e.g., polygonal, wavy, etc.). Furthermore, in certain embodiments, at least one of the transitions may be omitted (e.g., the engine mounting portion and the frame connection portion may form a right angle at the interface).

In the illustrated embodiment, the engine mount is formed from a single substantially flat piece of material (e.g., steel, aluminum, a composite material, etc.). Forming the engine mount from a single substantially flat piece of material may reduce the cost of the engine mount, as compared to forming the engine mount from multiple discrete elements. However, in other embodiments, the engine mount may be formed from multiple pieces coupled to one another (e.g., by fastener(s), by weld(s), by adhesive, etc.). In addition, in the illustrated embodiment, the opening 26 is the only aperture within the engine mount 24. As a result, the cost of the engine mount may be reduced, as compared to an engine mount having multiple separately formed apertures. However, as discussed in detail below, the engine mount may include multiple apertures in certain embodiments.

A thickness 52 of the engine mount 24 may be particularly selected to enable the engine mount to support the engine, and in certain embodiments, to facilitate dissipation of vibrational energy (e.g., due to movement of the engine relative to the frame during operation of the work vehicle). In the illustrated embodiment, the thickness 52 of the engine mount 24 is substantially uniform throughout the engine mount. As used herein, "substantially uniform" refers to a maximum thickness variation (e.g., along the vertical axis 44 of the engine mount 24) of less than 1 mm, less than 0.5 mm, less than 0.4 mm, less than 0.3 mm, less than 0.2 mm, or less than 0.1 mm. While the thickness 52 of the engine mount 24 is substantially uniform in the illustrated embodiment, in other embodiments, the thickness of the engine mount may vary (e.g., in one or more areas of the engine mount). In addition, in the illustrated embodiment, the engine mount 24 forms a substantially flat plate that is not bent or otherwise deformed. As used herein, "substantially flat plate" refers to a structure (e.g., the engine mount 24) having opposing primary surfaces (i.e., surfaces having the largest surface area) that deviate from a plane extending through the structure (e.g., a plane formed by the longitudinal axis 36 and the lateral axis 48 of the engine mount 24) by less than 5 mm, less than 2 mm, less than 1 mm, less than 0.5 mm, or less than 0.25 mm. While the engine mount forms a substantially flat plate in the illustrated embodiment, in other embodiments, the engine mount may have another suitable shape/configuration (e.g., including ramped/angled portion(s), bent portion(s), twisted portion(s), vertical protrusion(s), etc.).

In the illustrated embodiment, the engine mounting portion 32 does not contact the frame member 30 (e.g., directly or via another element, such as a fastener) while the frame connection portion 34 is coupled to the frame member 30 (e.g., while the substantially flat contact surface 40 of the engine mount 24 is engaged with the corresponding substantially flat contact surface 42 of the frame member 30). Furthermore, in the illustrated embodiment, the engine mounting system 22 does not include any additional structure(s) coupled to the engine mount 24 and to the frame member 30 (e.g., to support and/or to add structural rigidity to the engine mount). Accordingly, the engine mount 24 transfers a portion of the load/weight of the engine to the frame member 30 without the assistance of any additional structure(s). As such, the cost and complexity of the engine mounting system may be reduced, as compared to utilizing additional supporting structure(s). However, in other embodiments, at least one additional member (e.g., gusset, support, etc.) may be coupled to the engine mount and to the frame to support the engine mount (e.g., to provide assistance in supporting the load/weight of the engine).

Figure 4:
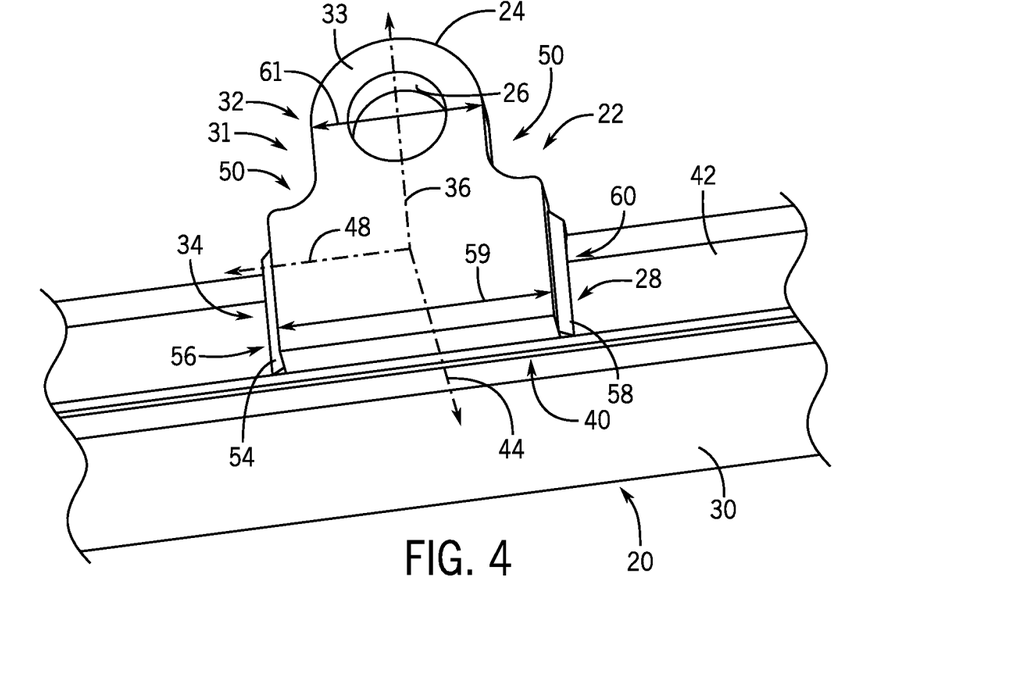
FIG. 4 is a bottom perspective view of the frame member and the engine mount of FIG. 3.

FIG. 4 is a bottom perspective view of the frame member 30 and the engine mount 24 of FIG. 3. As illustrated, the engine mount 24 is coupled to the frame member 30 by the welded connection 28. As previously discussed, a first weld of the welded connection 28 extends laterally across the substantially flat contact surface 40 of the frame connection portion 34 of the engine mount 24. In the illustrated embodiment, the welded connection 28 also includes a second weld 54 extending along a first lateral side 56 of the frame connection portion 34 and a third weld 58 extending along a second lateral side 60 of the frame connection portion 34. As illustrated, the second weld 54 and the third weld 58 extend substantially along the longitudinal axis 36 of the engine mount 24. The welds of the welded connection 28 are configured to couple the engine mount 24 to the frame member 30.

In the illustrated embodiment, the second weld 54 extends to the first weld, and the first weld extends to the third weld 58. Accordingly, a continuous weld is formed between the frame connection portion 34 of the engine mount 24 and the frame member 30 of the frame 20. However, in other embodiments, the second weld may be separated from the first weld, and/or the first weld may be separated from the third weld. Furthermore, while the first weld extends across the entire lateral extent of the frame connection portion in the illustrated embodiment, in other embodiments, the first weld may extend across a portion of the lateral extent of the frame connection portion. For example, in certain embodiments, multiple separate welds may extend laterally along the substantially flat contact surface of the frame connection portion of the engine mount. In addition, while each of the second and third welds extends along a substantial portion of the longitudinal extent of the respective lateral side of the frame connection portion in the illustrated embodiment, in other embodiments, the second weld and/or the third weld may extend along a smaller portion of the longitudinal extent of the respective lateral side of the frame connection portion. For example, in certain embodiments, multiple separate welds may extend longitudinally along at least one lateral side of the frame connection portion of the engine mount. Furthermore, in certain embodiments, at least one of the first, second, and third welds may be omitted, and/or the welded connection may include a fourth weld extending laterally along a rear side of the frame connection portion (e.g., the side of the frame connection portion positioned longitudinally opposite of the engine mounting portion).

As previously discussed, the extent 59 of the frame connection portion 34 along the lateral axis 48 (e.g., maximum lateral extent of the frame connection portion 34) is greater than the extent 61 of the engine mounting portion 32 along the lateral axis 48 (e.g., lateral extent of the engine mounting portion at the longitudinal center point of the opening 26). In the illustrated embodiment, the lateral extent 61 of the engine mounting portion 32 is about 60 percent of the lateral extent 59 of the frame connection portion 34. However, in other embodiments, the lateral extent 61 of the engine mounting portion 32 may be about 10 percent to about 90 percent, about 20 percent to about 80 percent, about 30 percent to about 70 percent, or about 40 percent to about 60 percent of the lateral extent 59 of the frame connection portion 34.

Figure 5:
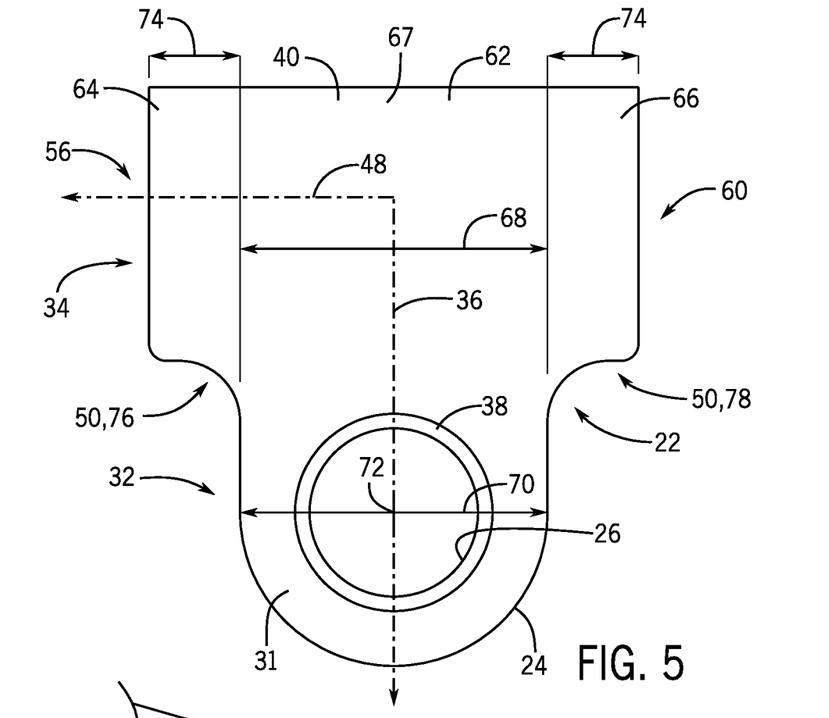
FIG. 5 is a top view of the engine mount of FIG. 3.

FIG. 5 is a top view of the engine mount 24 of FIG. 3. As previously discussed, the engine mount 24 has the engine mounting portion 32 and the frame connection portion 34. In addition, the engine mount has a center section 62, a first protrusion 64 extending from the center section 62 along the lateral axis 48, and a second protrusion 66 extending from the center section 62 along the lateral axis 48. The second protrusion 66 is positioned on an opposite lateral side of the center section 62 (e.g., opposite side of the center section 62 along the lateral axis 48) from the first protrusion 64. As illustrated, a thin line identifies the intersection of the center section with each respective protrusion. Furthermore, the center section 62 has the opening 26, and a lateral extent 68 (e.g., extent along the lateral axis 48) of a portion of the center section 62 that overlaps the first and second protrusions along the longitudinal axis 36 is equal to a lateral extent 70 (e.g., extent along the lateral axis 48) of the center section 62 at a center 72 of the opening 26.

The center section 62, the first protrusion 64, and the second protrusion 66 form a substantially flat surface 67 (e.g., including the substantially flat contact surface 40 discussed above) that extends over an entirety of the engine mount. Accordingly, the first surface 31 of the engine mounting portion 32 is coplanar with the substantially flat contact surface 40 of the frame connection portion 34. In addition, the substantially flat surface 67 (e.g., the substantially flat contact surface 40 of the substantially flat surface 67) is configured to engage the corresponding substantially flat contact surface of the frame member of the frame, and a portion of the center section 62 that forms the opening 26 does not contact the frame member (e.g., directly or via another element, such as a fastener) while the engine mount 24 is coupled to the frame member (e.g., while the substantially flat surface 67 of the engine mount 24 is engaged with the corresponding substantially flat contact surface of the frame member). The protrusions are configured to cause a substantial portion of the load/force applied by the engine to the laterally extending weld (e.g., first weld) via the engine mount to be directed through a laterally central portion of the weld. As a result, the longevity of the engine mount may be increased because stress concentrations are less likely to be present at the laterally central portion of the weld (e.g., as compared to the lateral end portions of the weld).

While the engine mount 24 has two protrusions in the illustrated embodiment, in other embodiments, one of the protrusions may be omitted. Furthermore, in the illustrated embodiment, the first protrusion 64 is symmetrical with the second protrusion 66 (e.g., a mirror image of the second protrusion 66) about the longitudinal axis 36 of the engine mount 24. However, in other embodiments, the first protrusion and/or the second protrusion may have a different configuration. In the illustrated embodiment, an extent 74 of each protrusion along the lateral axis 48 is about 30 percent of the lateral extent 68 of the portion of the center section 62 that overlaps the first and second protrusions along the longitudinal axis 36. However, in other embodiments, the extent 74 of each protrusion along the lateral axis 48 may be about 5 percent to about 100 percent, about 10 percent to about 75 percent, or about 20 percent to about 50 percent of the lateral extent 68 of the portion of the center section 62 that overlaps the first and second protrusions along the longitudinal axis 36.

In the illustrated embodiment, the first protrusion 64 has a first curved transition 76 extending to the center section 62, and the second protrusion 66 has a second curved transition 78 extending to the center section 62. A radius of curvature and/or a shape of each curved transition may be particularly selected to substantially reduce stress concentrations at the interface between the respective protrusion and the center section and/or to direct an increased portion of the load/force applied by the engine to the laterally extending weld through the laterally central portion of the weld. While the engine mount has two curved transitions in the illustrated embodiment, in other embodiments, at least one transition may have another suitable shape (e.g., polygonal, wavy, etc.). Furthermore, in certain embodiments, at least one of the transitions may be omitted.

In the illustrated embodiment, the opening 26 is offset from the first protrusion 64 and the second protrusion 66 along the longitudinal axis 36, such that the opening 26 does not overlap the first protrusion 64 along the longitudinal axis 36, and the opening 26 does not overlap the second protrusion 66 along the longitudinal axis 36. However, in other embodiments, at least a portion of the opening may overlap the first protrusion and/or the second protrusion along the longitudinal axis. In addition, in the illustrated embodiment, the opening 26 is the only aperture within the engine mount 24. As a result, the cost of the engine mount may be reduced, as compared to an engine mount having multiple separately formed apertures. However, as discussed in detail below, the engine mount may include multiple apertures in certain embodiments.

Figure 6:
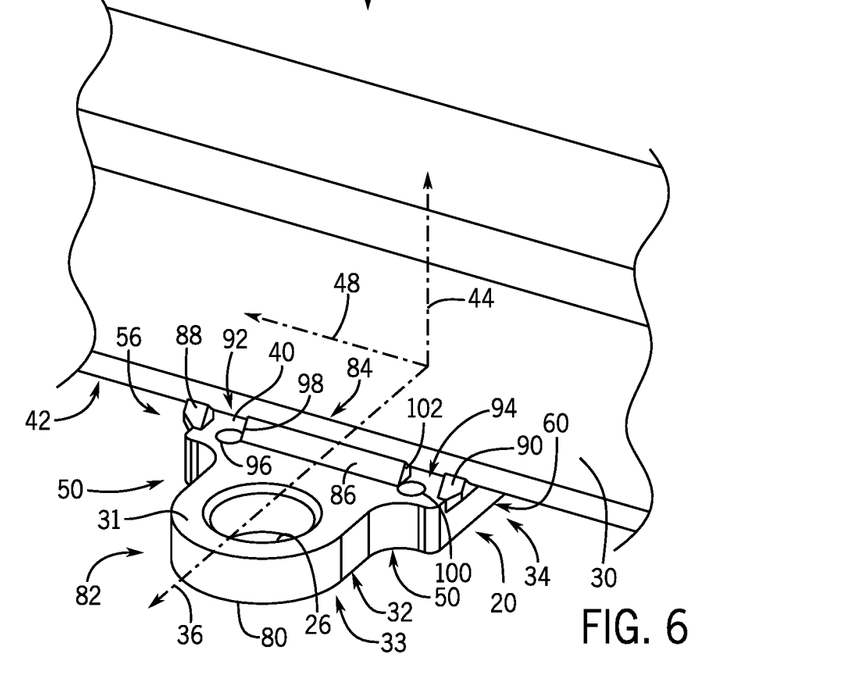
FIG. 6 is a perspective view of another embodiment of an engine mount coupled to the frame member of FIG. 3.

FIG. 6 is a perspective view of another embodiment of an engine mount 80 of an engine mounting system 82 coupled to the frame member 30 of FIG. 3. In the illustrated embodiment, the shape of the engine mount 80 is the same as the engine mount described above with reference to FIGS. 3-5. Accordingly, the engine mount 80 has an engine mounting portion 32 and a frame connection portion 34. The engine mounting portion 32 and the frame connection portion 34 are positioned on opposite longitudinal sides (e.g., opposite sides along the longitudinal axis 36) of the engine mount 80. In addition, the extent of the frame connection portion 34 along the lateral axis 48 is greater than the extent of the engine mounting portion 32 along the lateral axis 48. The engine mounting portion 32 has an opening 26 extending between the first surface 31 and the second surface 33 of the engine mounting portion 32. The opening 26 is configured to receive a fastener that couples the engine to the engine mount 80, and the frame connection portion 34 has a substantially flat contact surface 40 configured to engage the corresponding substantially flat contact surface 42 of the frame member 30 of the frame 20. Furthermore, the first surface 31 of the engine mounting portion 32 is coplanar with the substantially flat contact surface 40 of the frame connection portion 34. The engine mount also has a pair of curved transitions 50 between the engine mounting portion 32 and the frame connection portion 34. Furthermore, any of the variations to the engine mount shape/configuration described above with reference to FIGS. 3-5 may apply to the illustrated engine mount 80. For example, the engine mount may have a substantially trapezoidal shape.

In the illustrated embodiment, the engine mounting system 82 includes a welded connection 84 between the frame connection portion 34 of the engine mount 80 and the frame member 30, which in certain embodiments is also an element of the engine mounting system 82. As illustrated, a first weld 86 of the welded connection 84 extends laterally (e.g., along the lateral axis 48) across the substantially flat contact surface 40 of the frame connection portion 34 of the engine mount 80. The welded connection 84 also includes a second weld 88 extending along the first lateral side 56 of the frame connection portion 34 and a third weld 90 extending along the second lateral side 60 of the frame connection portion 34. In the illustrated embodiment, the second weld 88 and the third weld 90 extend substantially along the longitudinal axis 36 of the engine mount 80 (e.g., along a substantial portion of the longitudinal extent of the respective side of the frame connection portion 34). The welds of the welded connection 84 are configured to couple the engine mount 80 to the frame member 30. In addition, contact between the substantially flat contact surface 40 of the engine mount 80 and the corresponding substantially flat contact surface 42 of the frame member 30 substantially blocks rotation of the engine mount 80 relative to the frame member 30 about the longitudinal axis 36 and about the lateral axis 48.

In the illustrated embodiment, the first weld 86 only extends along a portion of the lateral distance between the second weld 88 and the third weld 90. As a result, a first lateral gap 92 is formed between the first weld 86 and the second weld 88, and a second lateral gap 94 is formed between the first weld 86 and the third weld 90. In the illustrated embodiment, a first aperture 96 is positioned at a first end 98 of the first weld 86, and a second aperture 100 is positioned at a second end 102 of the first weld 86. The apertures are configured to terminate the laterally outward propagation of any crack that forms within the engine mount 80 along the first weld 86 and/or to reduce the stress concentration within the engine mount 80 at the ends of the first weld 86, thereby increasing the longevity of the engine mount 80. The spacing between the apertures/length of the first weld may be particularly selected to establish a suitable connection between the engine mount and the frame member. In addition, while the apertures are circular in the illustrated embodiment, in other embodiments, at least one aperture may have another suitable shape (e.g., elliptical, ovoid, etc.). Furthermore, while the illustrated engine mount 80 has two apertures, in other embodiment, the engine mount may have more or fewer apertures. For example, in certain embodiments, the engine mount may have a single aperture at one end of the first weld, and the first weld may extend to the second/third weld, such that a continuous weld that includes the first weld and the second/third weld is formed. Furthermore, in certain embodiments, multiple separate welds may extend laterally along the substantially flat contact surface of the frame connection portion of the engine mount, and an aperture may be positioned at each end of each laterally extending weld (e.g., each end that does not intersect another weld). While the lateral extent of the frame connection portion is greater than the lateral extent of the engine mounting portion in the illustrated embodiment, in other embodiments, the lateral extent of the frame connection portion may be less than or equal to the lateral extent of the engine mounting portion, and the engine mount may include one or more apertures positioned at corresponding end(s) of laterally extending weld(s).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An engine mounting system for a work vehicle, comprising:
   an engine mount configured to support an engine on a frame of the work vehicle, wherein the engine mount has an engine mounting portion and a frame connection portion, the engine mounting portion and the frame connection portion are positioned on opposite longitudinal sides of the engine mount, an extent of the frame connection portion along a lateral axis of the engine mount is greater than an extent of the engine mounting portion along the lateral axis of the engine mount, the engine mounting portion has an opening extending between a first surface and a second surface of the engine mounting portion, the opening is configured to receive a fastener configured to couple the engine to the engine mount, the frame connection portion has a substantially flat contact surface configured to engage a corresponding substantially flat contact surface of a frame member of the frame, the first surface of the engine mounting portion is coplanar with the substantially flat contact surface of the frame connection portion, and the engine mounting portion does not contact the frame member while the substantially flat contact surface of the frame connection portion is engaged with the corresponding substantially flat contact surface of the frame member.

2. The engine mounting system of claim 1, wherein the frame connection portion extends laterally beyond the extent of the engine mounting portion along the lateral axis on both lateral sides of the engine mounting portion.

3. The engine mounting system of claim 1, wherein the engine mount has at least one curved transition between the engine mounting portion and the frame connection portion.

4. The engine mounting system of claim 1, wherein the engine mount is formed from a single piece of material.

5. The engine mounting system of claim 1, wherein the opening is the only aperture within the engine mount.

6. The engine mounting system of claim 1, comprising a weld extending along the frame connection portion of the engine mount, wherein the weld is configured to couple the engine mount to the frame member.

7. The engine mounting system of claim 6, wherein the engine mount has an aperture positioned at an end of the weld.

8. An engine mounting system for a work vehicle, comprising:
an engine mount configured to support an engine on a frame of the work vehicle;
wherein the engine mount has a center section, a first protrusion extending from the center section along a lateral axis of the engine mount, and a second protrusion extending from the center section along the lateral axis of the engine mount;
wherein the center section has an opening configured to receive a fastener configured to couple the engine to the engine mount, a lateral extent of a portion of the center section that overlaps the first and second protrusions along a longitudinal axis of the engine mount is equal to a lateral extent of the center section at a center of the opening, the second protrusion is positioned on an opposite lateral side of the center section from the first protrusion; and
wherein the center section, the first protrusion, and the second protrusion form a substantially flat surface extending over an entirety of the engine mount and configured to engage a corresponding substantially flat contact surface of a frame member of the frame, and a portion of the center section that forms the opening does not contact the frame member while the substantially flat surface of the engine mount is engaged with the corresponding substantially flat contact surface of the frame member.

9. The engine mounting system of claim 8, wherein the first protrusion is symmetrical with the second protrusion about the longitudinal axis of the engine mount.

10. The engine mounting system of claim 8, wherein the engine mount is formed from a single piece of material.

11. The engine mounting system of claim 8, wherein the opening is offset from the first protrusion and the second protrusion along the longitudinal axis of the engine mount, such that the opening does not overlap the first protrusion along the longitudinal axis, and the opening does not overlap the second protrusion along the longitudinal axis.

12. The engine mounting system of claim 8, wherein the first protrusion has a first curved transition extending to the center section, the second protrusion has a second curved transition extending to the center section, or a combination thereof.

13. The engine mounting system of claim 8, wherein the opening is the only aperture within the engine mount.

14. The engine mounting system of claim 8, comprising a weld extending along the substantially flat surface of the engine mount, wherein the weld is configured to couple the engine mount to the frame member of the frame.

15. The engine mounting system of claim 14, wherein the engine mount has an aperture positioned at an end of the weld.

16. An engine mounting system for a work vehicle, comprising:
a frame member of a frame of the work vehicle;
an engine mount configured to support an engine on the frame of the work vehicle, wherein the engine mount has an engine mounting portion and a frame connection portion, the engine mounting portion and the frame connection portion are positioned on opposite longitudinal sides of the engine mount, the engine mounting portion has an opening extending between a first surface and a second surface of the engine mounting portion, the engine mounting portion does not contact the frame member, the frame connection portion has a substantially flat contact surface engaged with a corresponding substantially flat contact surface of the frame member, and the first surface of the engine mounting portion is coplanar with the substantially flat contact surface of the frame connection portion; and
a welded connection between the frame connection portion of the engine mount and the frame member, wherein the welded connection comprises a weld extending laterally along the substantially flat contact surface of the frame connection portion of the engine mount, and the engine mount has an aperture positioned at an end of the weld.

17. The engine mounting system of claim 16, wherein the engine mount has a second aperture positioned at a second end of the weld.

18. The engine mounting system of claim 16, wherein an extent of the frame connection portion along a lateral axis of the engine mount is greater than an extent of the engine mounting portion along the lateral axis of the engine mount.

19. The engine mounting system of claim 16, wherein the engine mount is formed from a single piece of material.

20. The engine mounting system of claim 16, wherein the engine mount has at least one curved transition between the engine mounting portion and the frame connection portion.

* * * * *